(12) United States Patent
Ohsawa

(10) Patent No.: US 7,394,580 B2
(45) Date of Patent: Jul. 1, 2008

(54) IMAGE READING APPARATUS, IMAGE READING METHOD AND ORIGINAL TRANSPORT APPARATUS

(75) Inventor: Yukio Ohsawa, Yamanashi (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 1114 days.

(21) Appl. No.: 10/635,477

(22) Filed: Aug. 7, 2003

(65) Prior Publication Data
US 2004/0057079 A1    Mar. 25, 2004

(30) Foreign Application Priority Data
Aug. 7, 2002    (JP)    ............................. 2002-230565

(51) Int. Cl.
    *H04N 1/04*    (2006.01)
(52) U.S. Cl. ...................................... 358/498; 358/496
(58) Field of Classification Search ................ 358/496, 358/498, 408, 474, 486, 488, 505, 449; 399/373, 399/374, 370, 367, 364; 382/318, 319; 271/186, 271/291, 301, 3.01, 3.15
See application file for complete search history.

(56) References Cited

U.S. PATENT DOCUMENTS 5,181,714 A * 1/1993 Yamagishi et al. .......... 271/186
5,991,592 A * 11/1999 Kobayashi et al. .......... 399/374

FOREIGN PATENT DOCUMENTS

| JP | S56-075664 | 6/1981 |
| JP | 04295866 A | * 10/1992 |
| JP | H11-298667 | 10/1999 |

* cited by examiner

*Primary Examiner*—Cheukfan Lee
(74) *Attorney, Agent, or Firm*—Manabu Kanesaka

(57) ABSTRACT

An image reading apparatus includes a reading device for reading an original at a reading position; an image determining device for determining whether the original has a black and white image or color image; and an original length determining device for determining a length of the original in a transport direction. The original once read is returned to the reading position through a first circulating path or a second circulating path longer than the first circulating path by a selection device for selecting the first circulating path or the second circulating path according to a result of the determination by the original length determining device.

13 Claims, 15 Drawing Sheets

Fig.3 (a)     Spectral Responsivity Characteristics
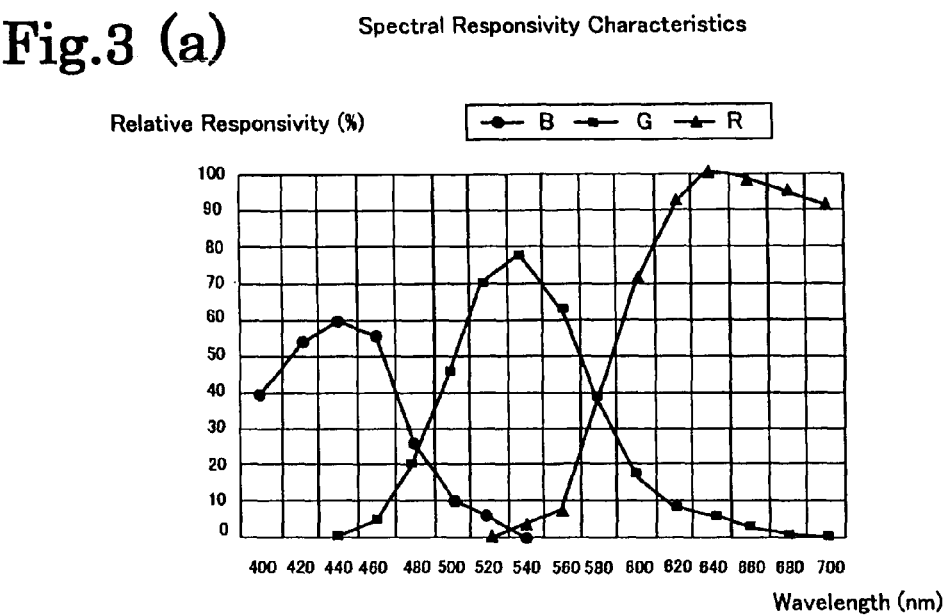
Fig.3 (b)     Black/White Original Spectral Reflectance Data
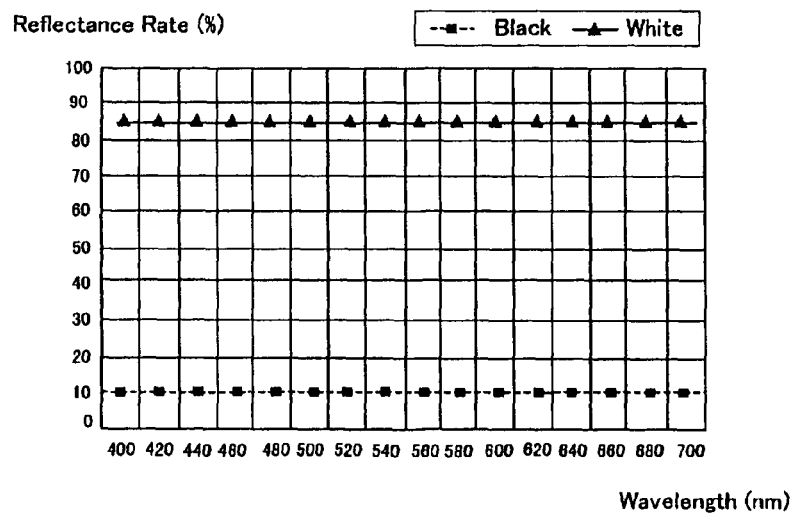

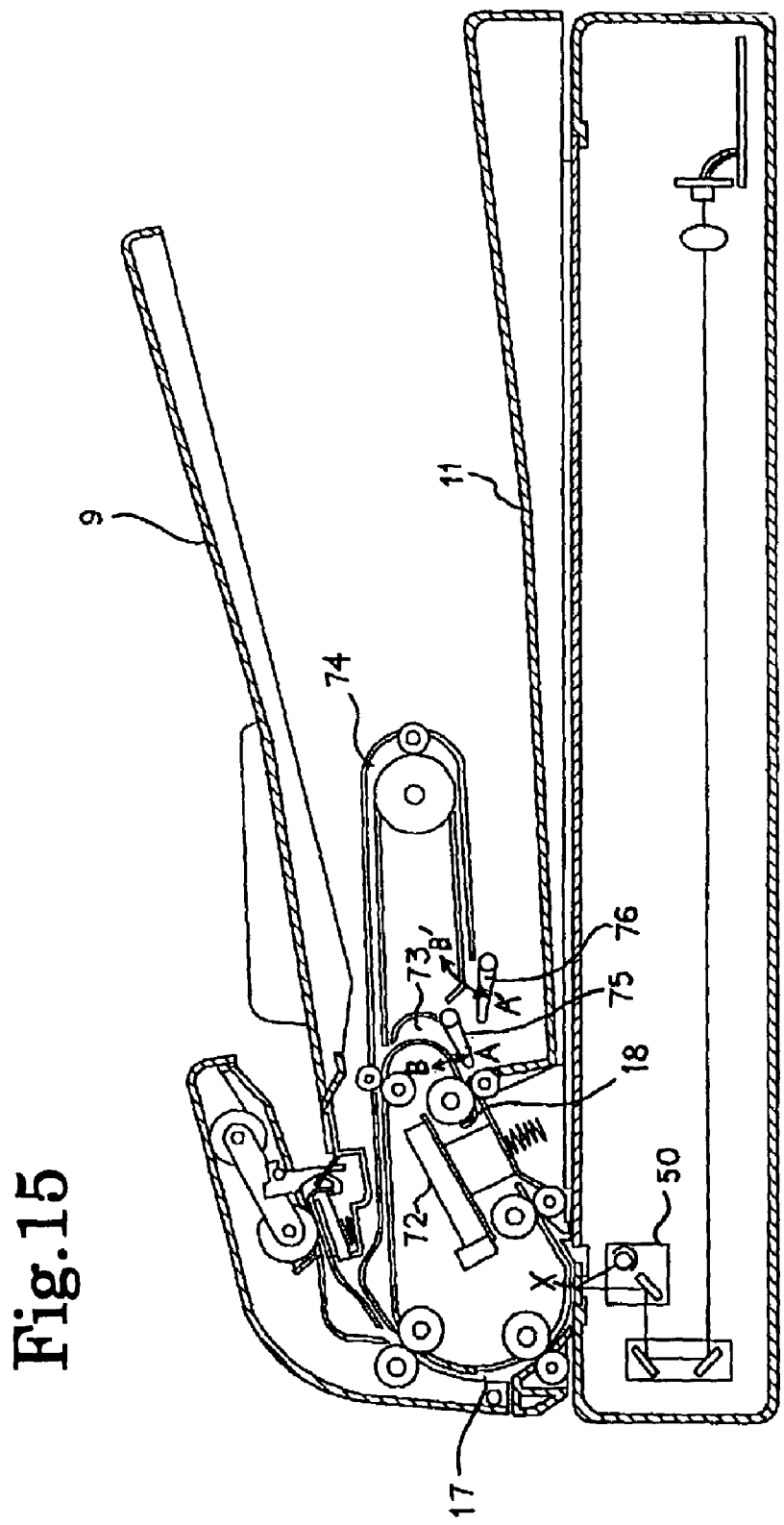

IMAGE READING APPARATUS, IMAGE READING METHOD AND ORIGINAL TRANSPORT APPARATUS

BACKGROUND OF THE INVENTION AND RELATED ART STATEMENT

The present invention relates to an image reading apparatus with an automatic document feeder apparatus (ADF) and an image reading method for reading an original transported to a platen. More particularly, the present invention relates to an image reading apparatus and an image reading method that determine whether an original to be read includes black and white images or color images, and read the images on the original according to a result of the determination.

In recent years, a computer, the Internet and electronic photos are widely used to handle color images. Accordingly, there has been an increasing demand for copying, printing, and transmitting the color images because of the superior quality as opposed to black and white images. For that reason, an image reading apparatus has been required to quickly read a color original with high quality.

However, when an image reading apparatus reads a color original, it is normally necessary to read image data for each of the three primary colors, namely red (R), green (G) and blue (B). Thus, when reading a color original with the same resolution as that of a black and white original, the image reading apparatus has to read at a speed slower than for reading a black and white original.

An image reading apparatus may read a set of originals including both color originals and black and white originals. When the apparatus reads such a set of originals in a color reading mode, a speed of reading the black and white originals will be dramatically slowed.

To solve this problem, a conventional apparatus pre-scans an original to determine whether the original has a black and white image or color image. Then, when the original has only a black and white image, the image reading apparatus reads at a comparatively high speed in a black and white mode. Conversely, when the original has a color image, the image reading apparatus uses the color reading mode with a slower speed. This system is known as the 'pre-scan/actual scan method'.

In Japanese Patent Publication (KOKAI) No. 09-261417, an image processing apparatus has been disclosed as a modified version of the 'pre-scan/actual scan method'. The reading apparatus is provided with a re-circulating document feeder. It is determined if the original has a black and white image or color image for all documents on the document tray through a process of transporting the originals through a reading position inside the apparatus. Then, the apparatus stores a result for each page of the originals stacked on the original tray. Next, for the actual reading, the originals are returned to the original tray and sequentially fed in the same order. Then, the determination result is retrieved for each original, and the originals are read according to the results based on whether the original has a black and white image or color image.

An image reading apparatus disclosed in U.S. Pat. No. 5,946,527 also employs the pre-scan/actual scan method to determine whether an original is in black and white or in color by reading the original in the process to pass the original on an original tray through a reading position. Then, the original is read again according to a result of the determination.

In the image reading apparatus, it is determined whether the original fed from the original tray includes a black and white image or color image when the original passes through the reading position on the platen. In the image reading apparatus, it is possible to rotate discharge rollers in both directions for discharging the original to the discharge tray. Thus, it is possible to reverse and transport the original to the reading position again, so that both sides of the original can be placed on the reading position.

Therefore, when the original passes through the reading position for the first time, the apparatus determines whether the original has a black and white image or color image. After a leading edge of the original is discharged to the discharge tray, the discharge rollers are rotated in reverse to switchback the original. The original is turned over front to back, so when passing through the reading position for the second time, the apparatus does not read the original. After the original is switched back again on the discharge tray, when the original passes through the reading position for the third time, the image thereupon is read according to the result obtained when the original passes through the reading position for the first time. While the apparatus stores the image data, the original is discharged to the discharge tray.

When the image reading apparatus uses the pre-scan/actual scan method, the same original transport path is used, regardless of a length of the original in the transport direction. Thus, a processing speed is drastically slowed down when the stack contains both black and white and color originals. A short-size original is also transported along a path same as that for a long size original, so that it still takes long time to read the entire original.

In addition to the problems described above, the apparatus disclosed in Japanese Patent Publication (KOKAI) No. 09-261417 has a large size because the original is discharged to the original tray to re-circulate through the tray. Also, it is necessary to provide a memory with a large capacity for storing the results for all the originals in one circulating operation. Furthermore, when the original is jammed during the actual scan, or some of the originals are mistakenly removed from the original tray after completing the first determination scan (pre-scan), an order of the originals is changed and the apparatus uses incorrect results for the actual scan.

The apparatus disclosed in U.S. Pat. No. 5,946,527 employs the pre-scan/actual scan method, and uses the transport path for reading both sides of the original as described above. The apparatus determines a type of original when the original passes through the reading position for the first time (pre-scan) When the original is turned over front to back and passes through the reading position for the second time, the original is not read. When the original is switched back and passes through the reading position for the third time, the apparatus reads the original (actual scan) according to the determination result in the first reading. Therefore, it is necessary to turn over the original without reading it when the original passes through the reading position. Thus, it is difficult to read the color original at a high speed, thereby taking longer to read the original.

In view of the problems associated with the prior art as described above, the first object of the present invention is to provide an original reading apparatus and original reading method capable of determining whether an original includes black and white image or color image when the original is read, thereby making it possible to read the original at a high speed.

The second object of the present invention is to provide an original reading apparatus and original reading method capable of switching an original transport path for an original having a frequently used size, so that it is possible to improve a speed of processing such an original.

The third object of the present invention is to provide an original supply device for supplying a duplex original (an original with images on both sides) and an original reading method of an apparatus provided with the original supply device so that it is possible to process at high speed even when the originals have images on both sides thereof, or include color images on one side or on both sides.

Further objects and advantages of the invention will be apparent from the following description of the invention.

SUMMARY OF THE INVENTION

In order to attain the aforementioned objects, according to the present invention, an image reading apparatus comprises reading means for reading an original at a predetermined reading position; image determining means for determining whether the original read by the reading means includes a black and white image or color image; original length determining means for determining a length of the original in a transport direction as at least a long length and a short length; a first circulating path for returning the original transported from the reading position to the reading position; a second circulating path having a length longer than that of the first circulating path for returning the original transported from the reading position to the reading position; and selection means for selecting one of the first circulating path and the second circulating path as a path for the original passed the reading position according to a result of determination by the original length determining means.

In the present invention, when the original with a frequently used size is transported, the transport path is switched. Therefore, it is possible to read all originals at a high speed, and to improve a speed of processing the originals with a frequently used size.

In the present invention, the second circulating path is composed of a branch path extending from the first circulating path at a downstream side of the reading position, and then connecting to the first circulating path. The branch path is a path for returning the original to the first circulating path after the original passes through the reading position and is discharged from the discharge outlet back. With this configuration, it is possible to reduce a space inside of the apparatus for providing the two circulating paths. Incidentally, the original length determining means may determine the length of the original based on data input from an external source.

According to the present invention, in an image reading method, optical reading means is disposed at a predetermined reading position for reading a transported original. The image reading method comprises the steps of determining a length of the original in a transport direction; reading an image on the original passing through the reading position; determining whether the original has a black and white image or color image; selecting one of a first circulating path and a second circulating path having a length longer than that of the first circulating path for returning the original to the reading position according to the length of the original; transporting the original to the reading position through the one of the first circulating path and the second circulating path; setting a mode of reading the original according to a result in the determining step; and reading the image on the original with the mode set in the setting step.

In the invention, it is possible to increase a speed of processing the original with a frequently used size. Further, it is possible to effectively perform the method of determining whether the original includes the black and white image or color image, thereby making it possible to read the original at a high speed.

According to the invention, an original transport device comprises a transport path for guiding an original fed from an original tray to a reading position; a first return path for returning the original to the transport path without turning over the original transported to the reading position; a second return path having a length longer than that of the first return path for returning the original to the transport path without turning over the original transported to the reading position; a switchback path for turning over the original transported from the reading position and for returning the original to the transport path; and a discharge path for discharging the original transported from the reading position to a discharge tray arranged below the original tray.

In the invention, the switchback path, the first return path and the second return path are arranged at a downstream side of the reading position. Furthermore, the second return path comprises path switching means for guiding the original transported to the discharge path to the first return path, thereby making is possible to use a space efficiently and making the apparatus small.

Further, according to the present invention, in an image reading method, optical reading means is arranged at a predetermined reading position for sequentially reading both sides of an original. The image reading method comprises the steps of determining a length of the original in a transport direction; reading one side of the original passing the reading position; determining whether the original has a black and white image or color image; selecting one of a first circulating path and a second circulating path having a length longer than that of the first circulating path for returning the original to the reading position according to the length of the original; transporting the original to the reading position through the one of the first circulating path and the second circulating path; setting a mode of reading the original according to a result in the determining step; reading the image on the original using the mode set in the setting step; turning over the original with the image on one side thereof having been read, returning the original to the reading position, and transporting the original to a switchback path; reading the image on the other side of the original turned over at the switchback path; determining whether the other side of the original has a black and white image or color image; transporting the original to the reading position via one of the first circulating path and the second circulating path; setting a mode of reading the other side of the original according to the result in the determining step; and reading the image on the original using the mode set in the setting step.

In the invention, it is determined whether the original includes black and white or color images on each side. Thus, it is possible to improve a speed of processing the original with a frequently used size, and to read the original at a high speed.

BRIEF DESCRIPTION OF THE DRAWINGS

FIG. 3(a) is a graph showing a relationship between relative sensitivity and a wavelength of color for each sensor, and FIG. 3(b) is a graph showing spectral reluctance data of a monotone original

FIG. 15 is a side view of an original transport device according to the present invention.

DETAILED DESCRIPTION OF PREFERRED EMBODIMENTS

Figure 1:
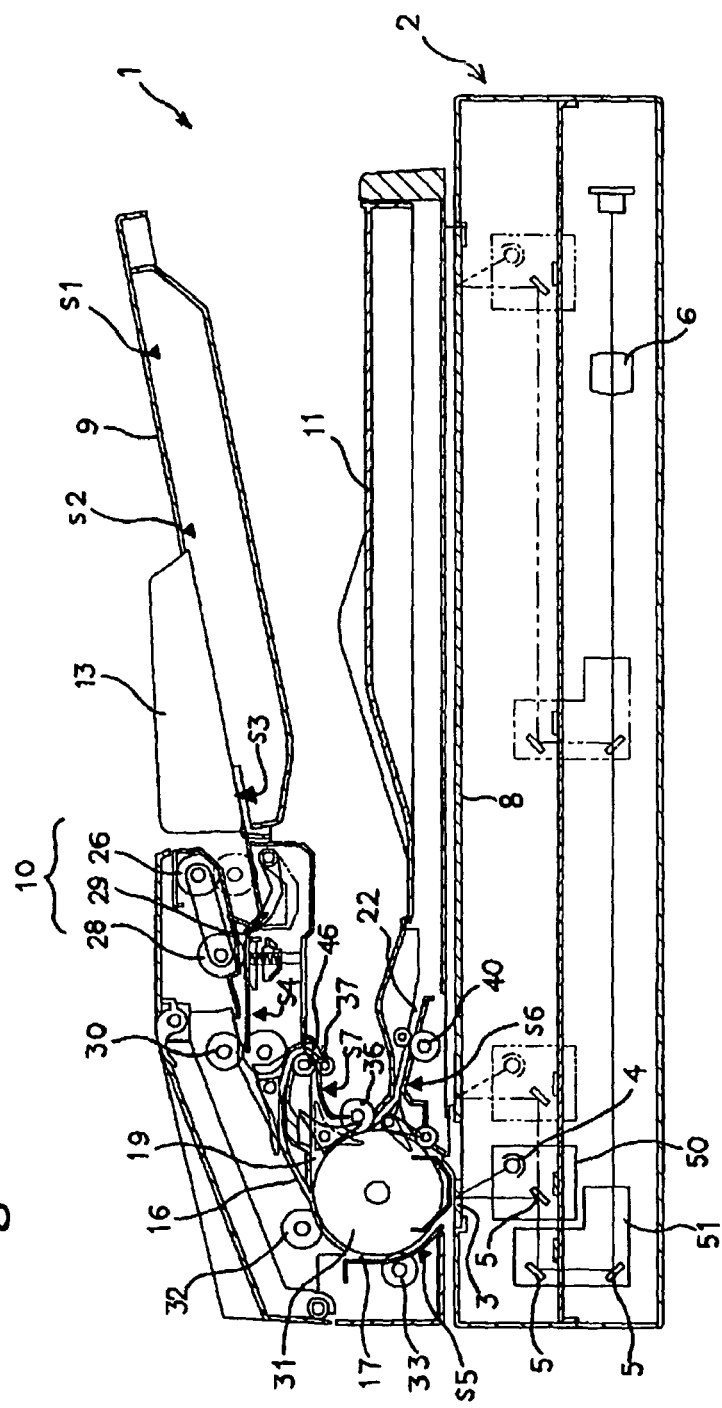
FIG. 1 shows an image reading apparatus according to the present invention.
Figure 2:
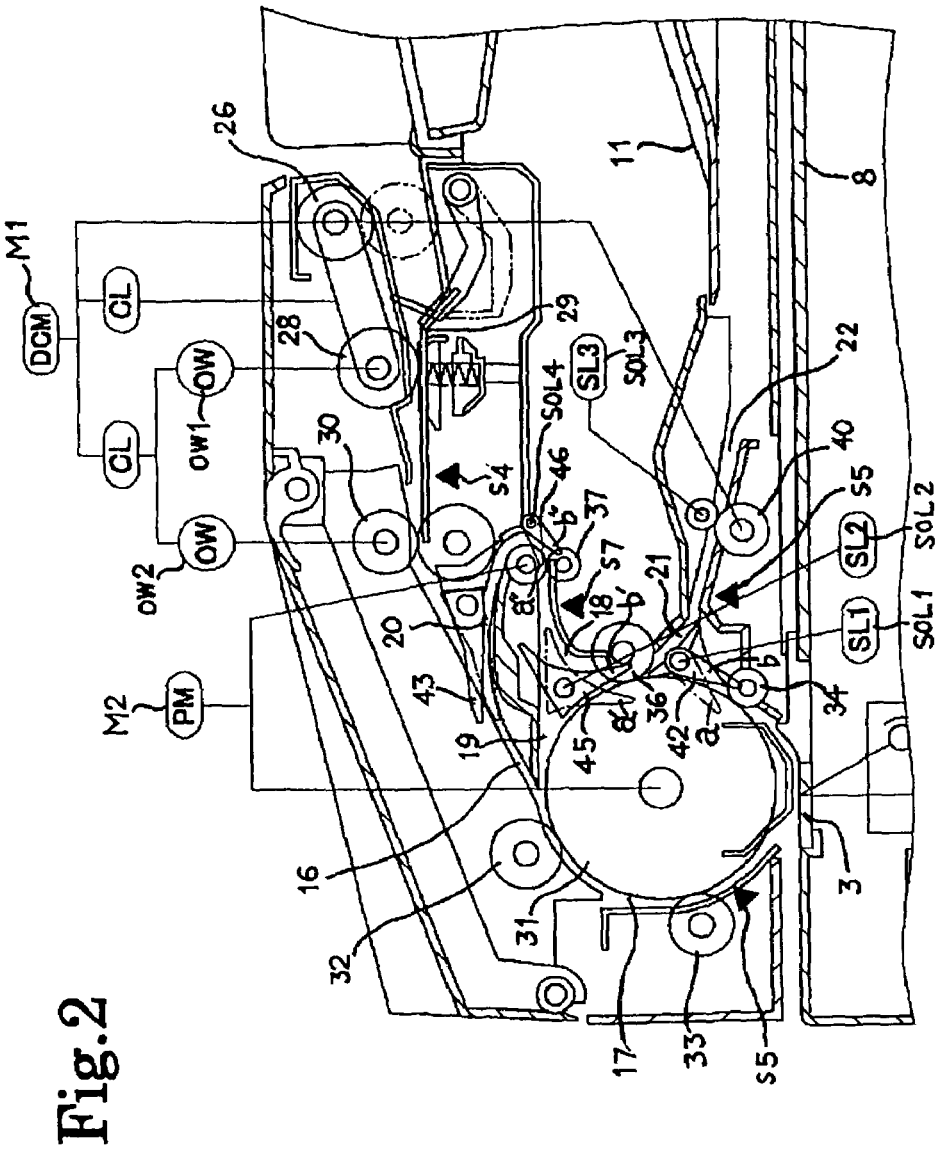
FIG. 2 shows an original transport mechanism of an ADF shown in FIG. 1.

Hereunder, preferred embodiments of the invention will be described in detail with reference to the accompanying drawings. FIG. 1 is a sectional view of an automatic document feeder (hereinafter referred to as ADF) and a reading device of an image reading apparatus according to the first embodiment of the present invention. FIG. 2 shows an original transport mechanism of the ADF.

As shown in FIG. 1, the image reading apparatus is provided with the ADF 1 and the reading device 2. The ADF 1 is mounted on the reading device 2 to transport an original to a top surface of the first platen 3 on the reading device 2.

The reading device 2 irradiates a transported original with light from a light source 4 such as a lamp through the first platen 3. The light reflected by the mirrors 5 forms an image on the condenser lens 6 to read the image on the original using the image sensor, i.e. Reading means such as a charged couple device (CCD). Specifically, the first platen 3 is the reading position (reading unit) on the reading device 2. Also, the reading device 2 is provided with a second platen 8 with a surface area large enough to cover the entire surface of an original. The reading device 2 can read a thick original such as a book by opening the ADF 1 and placing the thick original on the second platen 8. The first carriage 50 and the second carriage 51 composed of the light source 4 and the collecting mirror 5 move in the sub-scanning direction to read the image on the thick original, via the second platen 8.

The ADF 1 is equipped with the original tray 9 for stacking a plurality of originals; supply means 10 for supplying an original stacked on the original tray 9 one at a time to a reading position; and a discharge tray 11 for storing an original discharged from the reading position.

Also, the ADF 1 comprises the sheet supply path 16 for supplying an original stacked on the original tray to a reading position on the first platen 3 one at a time; the transport path 17 connected to the sheet supply path 16 for guiding the original along the top of the first platen 3; the discharge path 18 extending from the transport path 17 and connected to the discharge tray 11; the first circulating path 19 for guiding the original from the discharge path 18 to the reading position again; the second circulating path 20 joined to the connecting potion of the sheet supply path 16 and the transport path 17 for returning the original from the discharge outlet on the discharge tray 11 to the reading position; an intermediate path 21 branching from the discharge path 18 for guiding the original from the transport path 17; and the switchback path 22 for switching back the original transported from the intermediate path 21.

In a duplex reading mode, the switchback rollers 40 nip the trailing edge of the original to read the images on both sides of the original. Then, the rollers rotate in reverse to switch back a travel direction of the original from front to back. The rollers are controlled to transport the original to the reading position on the first platen 3 via either the first circulating path 19 or the second circulating path 20.

According to the invention, the original transport means has a function for re-transporting the original to a predetermined reading position. That is, after the original is transported in the discharge direction, the original is transported again to the reading position. The original is switched back in an upstream direction opposite to the discharge direction, and transported again to the reading position.

Arranged on the sheet supply path 16 are the feed rollers 26 for feeding an original; the transport roller 28 for transporting the original fed by the feed rollers 26; the separation member 29 for allowing the transport roller 28 to transport only the uppermost single original and preventing the second and subsequent originals from being fed; and the pair of register rollers 30 for sending the original transported by the transport roller 28 further downstream after aligning leading edge thereof.

The feed rollers 26 and the transport roller 28 are interconnected to the sheet supply motor Mr. Via the one-way clutch OWE. Also, the register rollers 30 are interconnected to the sheet supply motor Mr. Via the one-way clutch OWE. Through this configuration, the sheet supply motor Mr. Rotates the feed rollers 26 and the transport roller 28 in the forward rotation and rotates the register rollers 30 in the reverse rotation.

To the transport path 17 are arranged the large transport roller 31 and a plurality of follower rollers 32, 33 and 34 pressing against the outer circumference of the transport roller 31. The transport roller 31 is driven in forward and in reverse by the transport motor M.D.

The follower roller 36 that presses against the transport roller 31, and the pair of discharge rollers 37 that discharge the original to the discharge tray 11 are arranged on the discharge path 18. The discharge roller 37 is interconnected to the transport motor M.D. That can rotate in forward and in reverse. Also, as described above, below the discharge path 18 is formed the switchback path 22.

In order to transport the original without hindrance when the leading and trailing edge of the original circulating via the circulating path 19 and the transport path 17 cross each other, the pair of switchback rollers 40 on the switchback path 22 is configured so that a solenoid SOL 3 separates one of the switchback rollers 40 from the other switchback roller 40. The switchback rollers 40 are interconnected to the sheet supply motor Mr. That can rotate in forward and in reverse.

Above the discharge path 18 is disposed a second circulating path 20 for re-circulating the original so that the trailing edge and the leading edge do not overlap in case of a large-size original, when the image determining means identifies color images on the original reading surface to re-read the original and the control means terminates the reading of the original.

At a downstream side of the transport path 17 is arranged the switchback flapper 42 to guide the original to one of the discharge path 18 and the switchback path 22. The switchback flapper 42 is driven by a solenoid SOL 1. The switchback flapper is driven to the position (a) shown in the drawings when guiding the original to the switchback path 22, and is positioned at the position (b), or a home position, when guiding to the discharge path 18.

Also, at a downstream side of the switchback flapper 42 is arranged the first discharge flapper 45 that guides the original to one of the first circulating path 19 and the discharge roller 37. The first discharge flapper 45 is driven by a solenoid SOL 2. The first discharge flapper 45 is positioned at the position (a'), or a home position, shown in the drawings, when guiding an original to the discharge roller 37, and is driven to the position (b') when guiding an original to the first circulating path 19.

Furthermore, at a downstream side of the discharge roller is arranged the second discharge flapper 46 that guides the original to one of the second circulating path 20 and the discharge tray 11. The second discharge flapper 46 is driven by a solenoid SOL 4. The second discharge flapper 46 is positioned at the position (b"), or a home position, shown in the drawings, when guiding the original to the second circulating path 20 and is driven to the position (a") when guiding the original to the discharge tray 11.

To the second circulating path 20 above the discharge path 18 is arranged the free-falling flapper 43 that moves upward by the leading edge of the original to pass and guide the original to the second circulating path 20. When the trailing edge of the original passes there through, the flapper moves downward.

Still further, on the original tray 9 are arranged the length sensors S1 and S2 that detect the length of the original on the original tray 9, and the empty sensor S3 that detects the original. On the sheet supply path 16 is arranged the register sensor S4. On the transport path 17 is arranged the read sensor S5.; on the switchback path 22 is arranged the switchback sensor S6.; and on the discharge path 18 is arranged the discharge sensor S7. These sensors are connected to the control unit (control means). Also, the sheet supply path 16 and the transport motor M.D. Are connected to a transport control unit (not shown in the drawings). Also, the pressure solenoid SOL1, the solenoid SOL2 and the solenoid SOLE are connected to the transport control unit.

Based on the signal output from each of the sensors S1 to S7. And the image determining means, each of the motors M1 and M2 and the solenoids SOL1 to SOL3 are controlled to execute the original transport operation by the control unit. The discharge roller 37 is interconnected to the transport motor M2 that can rotate in only one direction.

Note that in this embodiment of the present invention, the switchback path 22 is disposed as described above. The leading and trailing edges of the original are switched in the path 22 to turn the original over from front to back. It is also possible to turn the original over from front to back by inverting the discharge path 18 and the discharge roller 37, without establishing the switchback path 22. Specifically, it is possible to configure a discharge roller that can rotate in both forward and in reverse and interconnect that to the discharge roller 37.

Through this configuration, the discharge rollers 37 are controlled to rotate in reverse while nipping the trailing edge of the original when reading in the duplex mode to read images on both sides of an original, so that the original is switched back and sent to the transport path 17 via the circulating path 19. It is also perfectly acceptable to configure the pair of discharge rollers 37 to use a pressing solenoid SOL to separate a discharge roller 37 from the other discharge roller 37, so that unhindered transport of the original is possible without the leading and trailing edges thereof pass each other when the original is circulated via the first circulating path 19 and the transport path 17. Specifically, the discharge path 18 and the paired discharge rollers 37 have a function to switchback the travel direction of the original from front to back.

According to this embodiment, when the original is read, the image determining means determines a surface of the original to read. When it is determined to read the original (for example when changing from the black and white reading mode to the color reading mode), the control means terminates the reading of the original and transports it to the discharge path 18. The original that is sent to the discharge path 18 is then transported to either the first circulating path 19 or the second circulating path 20 according to the size of the sheet, and is then re-transported to the first platen 3 via the transport path 17.

In this way, when the original is re-transported and set at the reading position on the first platen 3, the original is transported at a control speed, for example a slow speed for the color reading mode to reread the original.

Based on the signals output from each of the sensors of S1 to S7 and the image determining means, each of the motors of M1 and M2 And the solenoids of SOL1 to SOL3 is controlled to execute the original transport operation by the control unit.

The following will describe a process of determining a size of the original. At first, the first method of determining an original size uses the two length detection sensors S1 and S2 disposed on the original tray 9 and the empty sensor Se that detects the originals on the original tray 9.

When the length detection sensors S1 and S2 are off and only the empty sensor S3 is on, it is determined that the length of the original is shorter than a width of the A4 size. When the length detection sensor S1 is off and the length detection sensors S2 and the empty sensor S3 are on, it is determined that the length of the original is shorter than a length of the A4 size. Further, when the length detection sensors S1 and S2 and the empty sensor S3 are on, it is determined that the length of the original is longer than a length of the B4 size.

When the original is sent to the sheet supply path 16, the register sensors St. Arranged at an upstream side of the register rollers 30 determine the width of the original. The register sensors S4 are arranged at plural positions in the width direction of the original on the sheet supply path 16 to determine the length of the original in the width direction through on/off of each sensor. The size of the original is determined according to the detection of the length of the original in the transport direction and the width direction.

The second method of determining the original size uses the two length detection sensors S1 and S2 disposed on the original tray 9 and the empty sensor S3 that detects the originals on the original tray 9. When the length detection sensors S1 and S2 are off and only the empty sensor S3 is on, it is determined that the length of the original is shorter than a width of the A4 size. When the length detection sensor S1 is off and the length detection sensors S2 and the empty sensor S3 are on, it is determined that the length of the original is shorter than a length of the A4 size. Further, when the length detection sensors S1 and S2 and the empty sensor S3 are on, it is determined that the length of the original is longer than a length of the B4 size.

A plurality of register sensors S4 is arranged in the width direction of the original on the sheet supply path 16 at an upstream side of the register rollers 30, and determines the width of the original with the first method. In the second method, a slide volume (variable resistor), not shown in the drawings, is interconnected to the movement of the movable side plate 13 (see FIG. 1) in the width direction to regulate the side edges of the original, and rotates to determine the size of the original. The size of the original is determined according to the detection of the length of the original in the transport direction as described above, and the detection of the width of the original by the slide volume (variable resistor).

In the third method of determining the original size, the length of the original in the transport direction is determined to be shorter than a width of the A4 size when the register sensor S4 detects the trailing edge of the original (the state in which the register sensor S4 is off), and longer than a width of the A4 size when the register sensor S4 turns on, after the register rollers 30 transport the original for a predetermined distance to the read sensor S5.

A slide volume (variable resistor), not shown in the drawings, is interconnected to the movement of the movable side plate 13 in the width direction to regulate the side edges of the original, and is used to detect the width of the original. The size of the original is determined according to the detection of the length of the original in the transport direction using the register sensor S4 as described above, and the detection of the width of the original by the slide volume (variable resistor).

In the fourth method of determining the original size, the length of the original in the transport direction is determined to be shorter than a width of the A4 size when the register sensor S4 detects, the trailing edge of the original (the state in which the register sensor S4 is off), and longer than a width of the A4 size when the register sensor S4 turns on, after the register rollers 30 transport the original for a predetermined distance to the read sensor S5 the register sensor S4 arranged at an upstream side of the register rollers 30 determines the width of the original.

The register sensors S4 are arranged at plural positions in the width direction of the original on the sheet supply path 16, and determine the width of the original through on or off of each sensor. The size of the original is determined according to the detection of the length of the original in the transport direction and the width of the original.

Note that to determine the size of the original, the four methods are available as described above. In this embodiment of the invention, the first method is employed. The other methods can also be employed. Furthermore, it is also perfectly acceptable to use an input from an operation panel on an external device or through an input from a personal computer to determine the size of the original.

The following will describe an image reading method according to the present invention. At first, the following will explain a method for determining whether the image to read is a black and white image or a color image.

FIG. 3(a) is a graph showing a relationship between relative sensitivity and a wavelength of color for each sensor, and FIG. 3(b) is a graph showing spectral reluctance data of a monotone original. As shown in FIG. 3(a), since each line sensor, R, G, and B, has a spectral sensitivity peak at a different wavelength in the reading level of the sensors, each line sensor generates an output peak value at different wavelengths when reading color originals.

On the other hand, as shown in FIG. 3(b), a monotone (black and white) original shows a constant spectral reluctance rate regardless of the wavelength. In the figure, each line sensor generates a constant high output for white pixels and a constant low output for black pixels. Because of this difference, it is possible to determine whether an original to be read is either in color or black and white.

Note that because it is possible to determine the image by checking the peak wavelength of the line sensor output, even when reading the original at high speed in the black and white mode, this operation is possible.

In this way, the color detection unit in this invention is configured to receive an output from a shaded correction unit converted into a digital signal at the red, green and blue line sensors. When a difference is detected in the output color patterns from the sensors, it is determined to be a color original. Conversely, when there is no difference, it is determined to be a black and white original.

In this embodiment of the invention, an image-signal control apparatus (the control unit) is provided with a data memory unit 107 (see FIG. 4 and FIG. 5) to sequentially store image data read by the reading means. Depending on the type of image reading apparatus, it is possible to output image data from the reading means to an image forming apparatus without a data memory to store the image data after processing correction of the image data. In such a case, the determining means uses the processed signal of the image data from the reading means to determine whether the image data is black and white or color.

Figure 4:
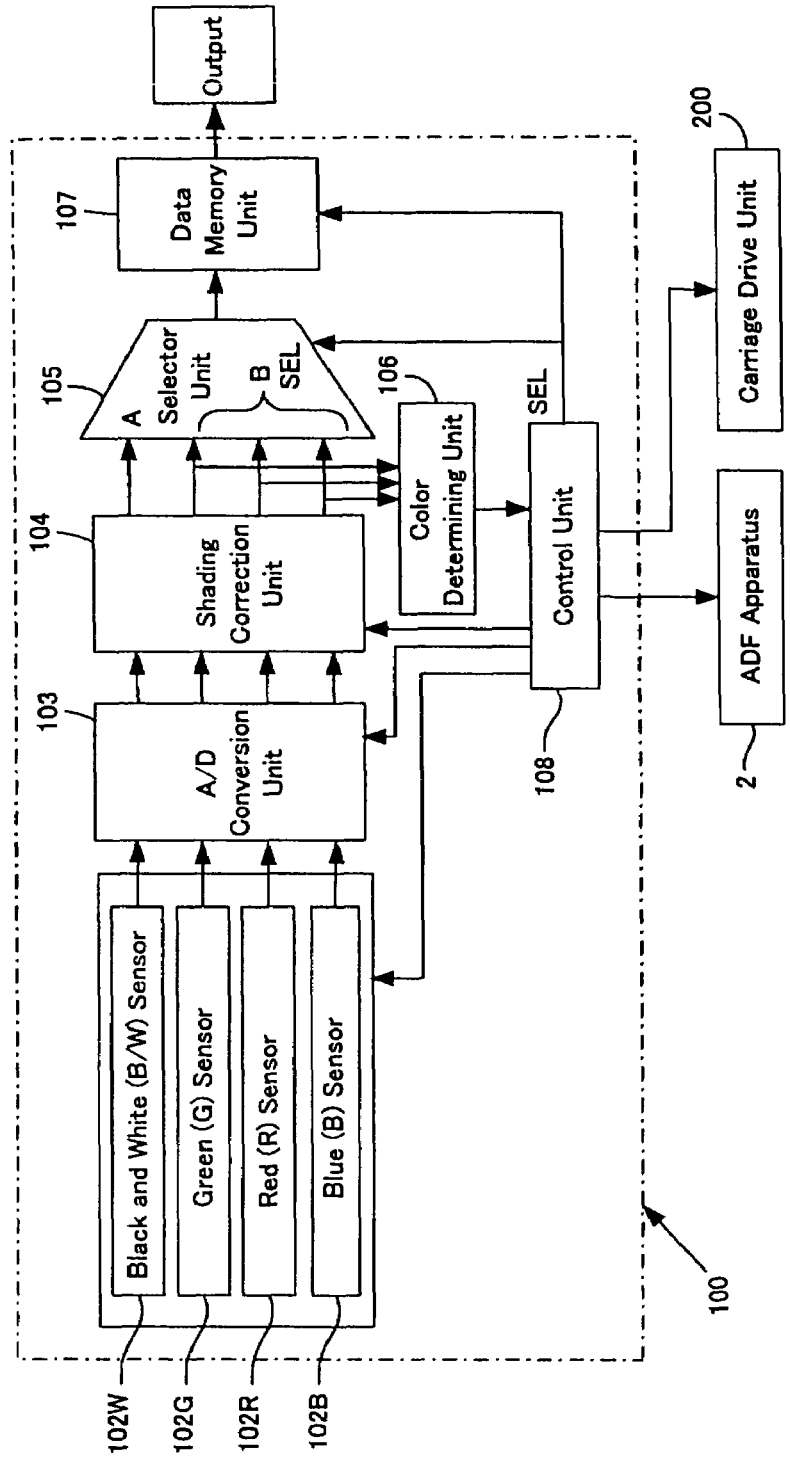
FIG. 4 is a circuit diagram of an image signal control unit with four line sensors including a black and white sensor.

FIG. 4 shows a circuit configuration of a control apparatus 100 having four line sensors, namely three line sensors of red (R), green (G), and blue (B), and a black and white (B/W) sensor. The control apparatus 100 shown in FIG. 4 includes an A/D conversion unit 103 to convert analog data read by the four line sensors 102W, 102R, 102G and 102B into digital data; and a shading correction unit 104 for correcting shading of the converted data (sensitivity correction between photoelectric conversion elements).

The control apparatus 100 also comprises a color detection unit 106 for determining a gradation of the shading corrected data; a control unit 108 for receiving a result determined by the color detection unit and outputting a signal to control the image reading apparatus; a color selector unit 105 for switching and outputting monotone data or color data according to a SEL signal from the control unit 108; and a data memory unit 107 for storing the image data after switching between a monotone mode and a color mode according to the SELL signal from the control unit 108 and outputting it to an image forming apparatus.

In the control circuit shown in FIG. 4, image data from the black and white sensor 102W are used as image data in the first reading mode (the monotone reading mode). At the same time, it is determined whether it is a color original based on the output from the green sensor 102G, the red sensor 102R and the blue sensor 102B.

Figure 5:
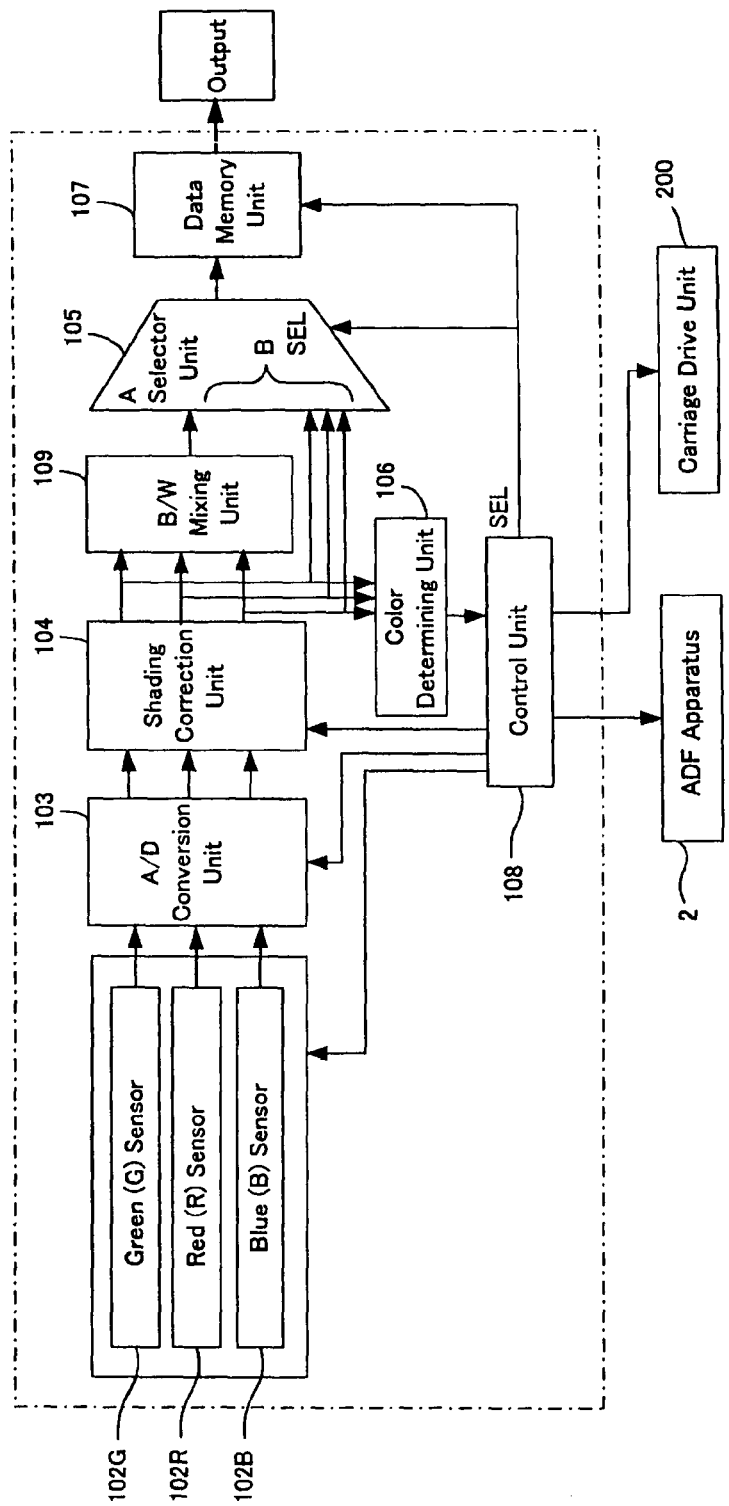
FIG. 5 is a circuit diagram of an image signal control unit with three line image sensors.

FIG. 5 shows the image signal control unit 100b that uses the three line sensors of red (R), green (G) and blue (B). The image-signal control unit 100b comprises the line sensors 102R, 102G and 102B; an A/D conversion unit 103 for converting analog data read by the three line sensors; a shading correction unit 104 for correcting shading of the converted data; a monochrome conversion unit 109 for generating black signals based on the shading corrected data; a color detection unit 106 for determining a gradation of the shading corrected data; and a control unit 108 for receiving a result determined by the color detection unit and outputting a signal to control the image reading apparatus.

The image signal control unit 100b also includes a color selector unit 105 for switching and outputting monotone data or color data according to a SEL signal from the control unit 108; and a data memory unit 107 for storing the image data after switching between a monotone mode and a color mode according to the SEL signal from the control unit 108 and outputting it to an image forming apparatus.

With the configuration described above, in the control circuit shown in FIG. 5, the image data in the first reading mode (the monochrome mode) becomes AND values of the output from the green (G), red (R) and blue (B) line sensors. Based on whether there is a difference in the output patterns from the green sensor 102G, the red sensor 102R and the blue sensor 102B, it is possible to determine whether the original is in color or black and white.

Figure 6:
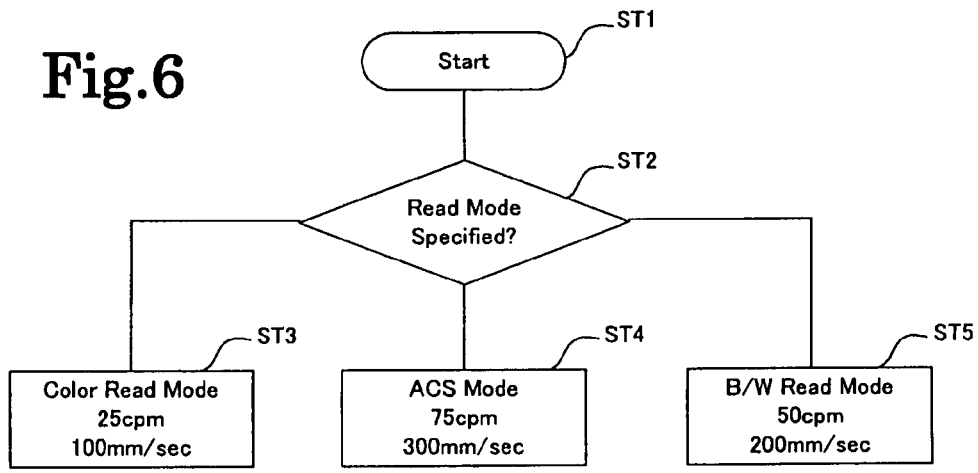
FIG. 6 is a chart showing a process of setting a reading mode of the image reading apparatus.

The following describes an example of an original reading mode control according to the present embodiment. FIG. 6 is a flowchart showing a process of setting the reading mode. An operator sets (ST2) The reading mode shown in FIG. 6, when the image reading apparatus starts to read the original (ST1).

When the reading mode is set to be the color reading mode (ST3), the image reading apparatus reads the original at a low speed in the color reading mode (25 CMP/100 mm/sec). If the black and white reading mode (ST5) Is selected, the image reading apparatus reads the original at a high speed in the black and white mode (50 CMP/200 mm/sec). When an auto-color select (ACS) mode is selected (ST4), the images are read according to the high speed ACS reading mode (75 CMP/300 mm/sec).

The following will describe an operation of transporting the original with an ADF according to the present invention, with reference to FIGS. 7(a)-7(c) to FIG. 13.

Figure 11:
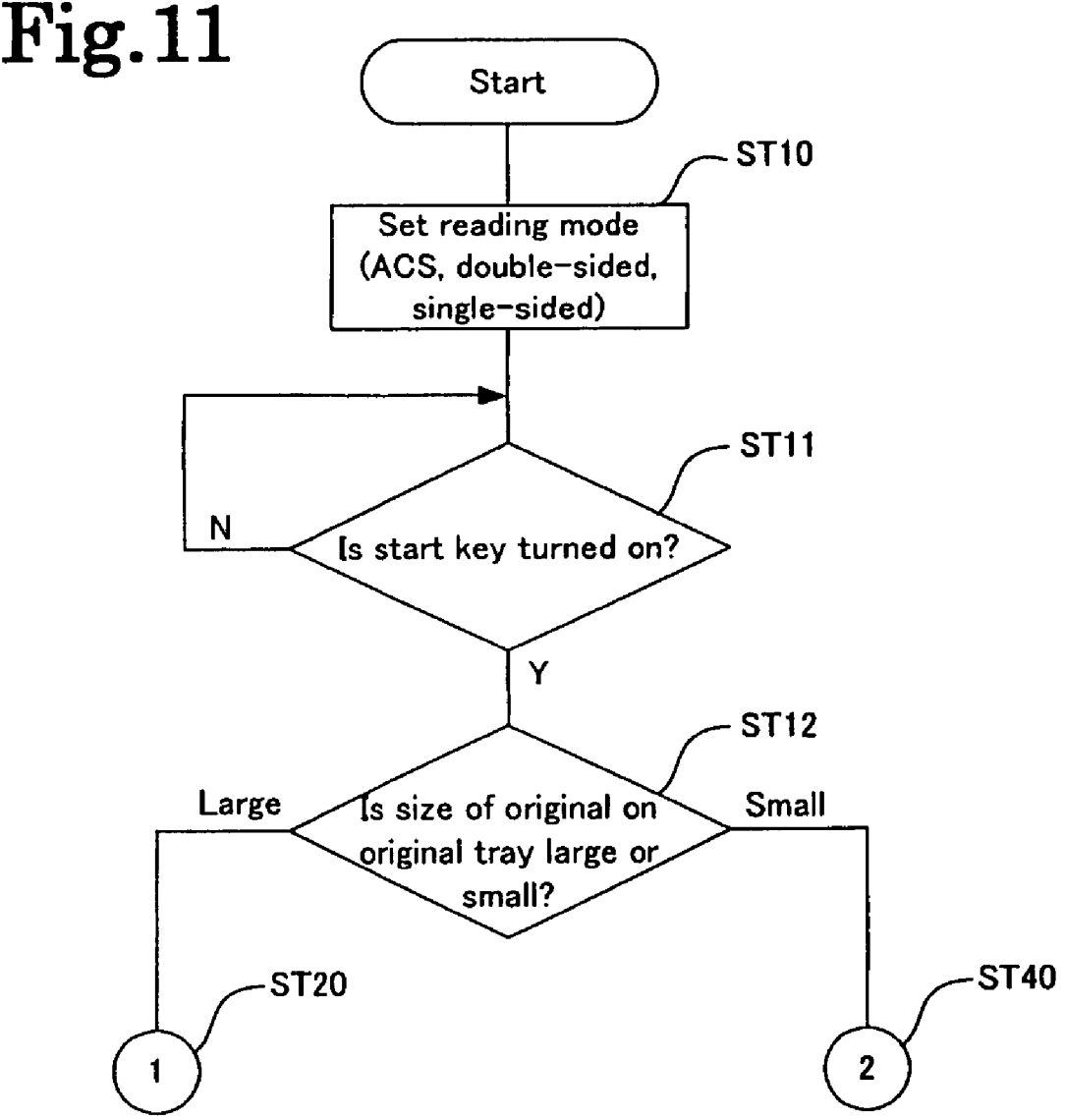
FIG. 11 is a flow chart for controlling an image reading operation.
Figure 12:
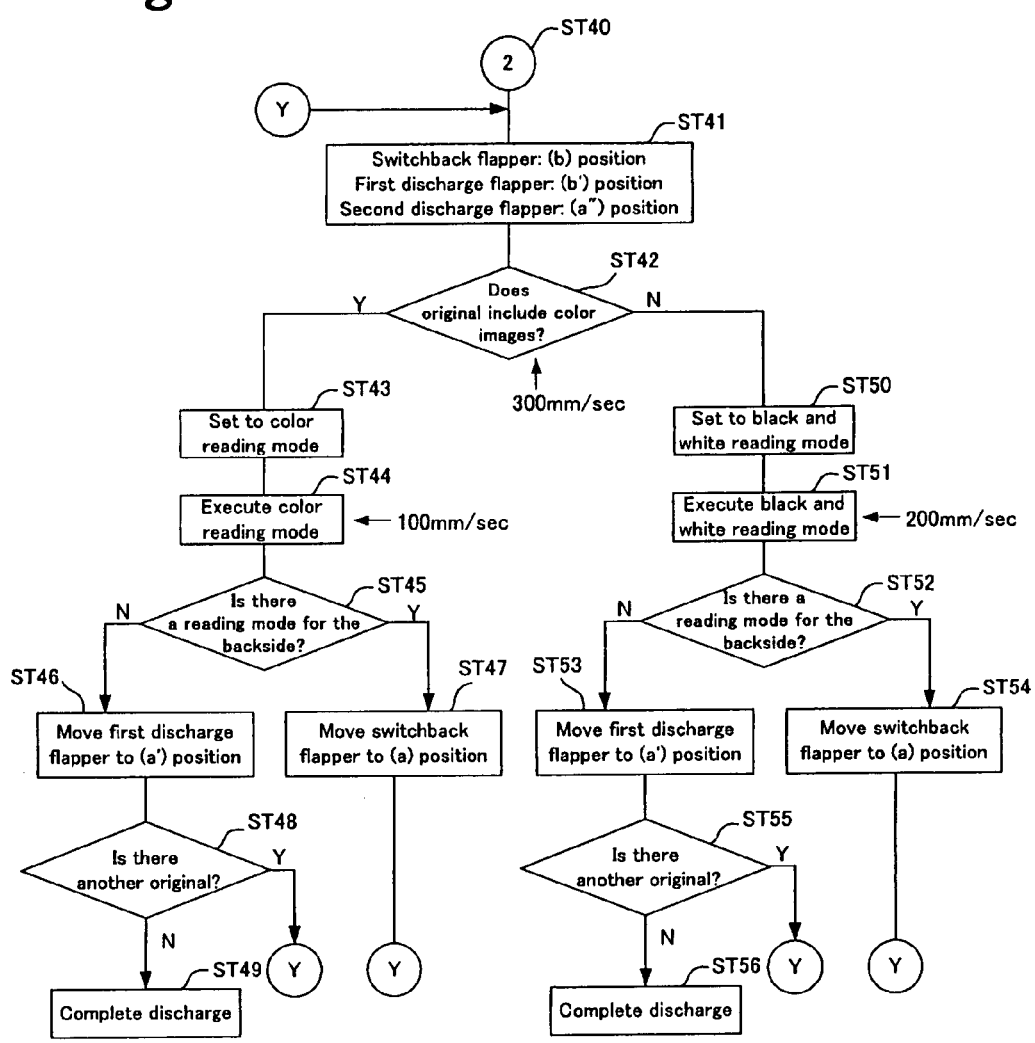
FIG. 12 is a flow chart for controlling the image reading operation.
Figure 13:
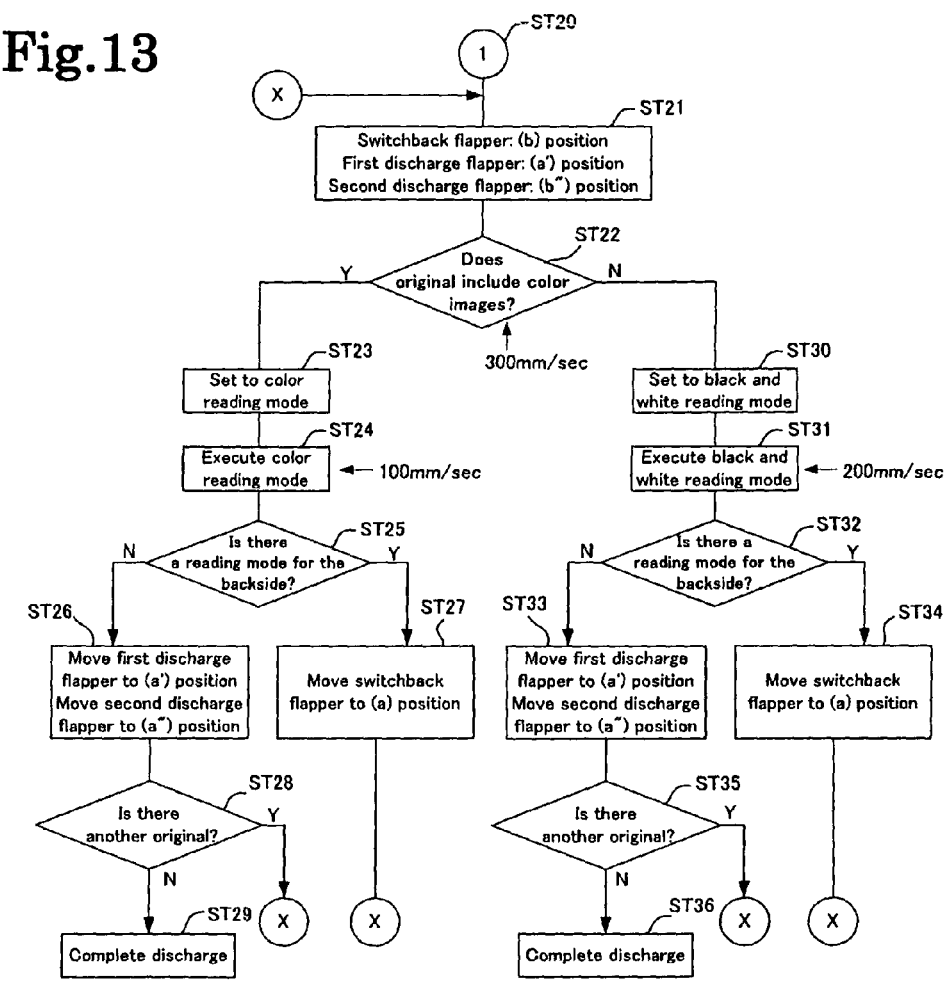
FIG. 13 is a flow chart for controlling the image reading operation.

FIGS. 7(a)-7(c) to FIGS. 10(a)-10(c) show operations of transporting the original using the original transport mechanism in the ADF; FIG. 11 to FIG. 13 show flow charts showing reading operations as shown in FIGS. 7(a)-7(c) to FIGS. 10(a)-10(c).

First, the original is placed on the original tray 9. The reading mode is set (ST10 in FIG. 11) and the start key is turned on (ST11 in FIG. 11). The sensors S1, S2 on the original tray 9 and the register sensor S4 detect the size (large or small) of the original (ST12 in FIG. 11).

Figure 7:
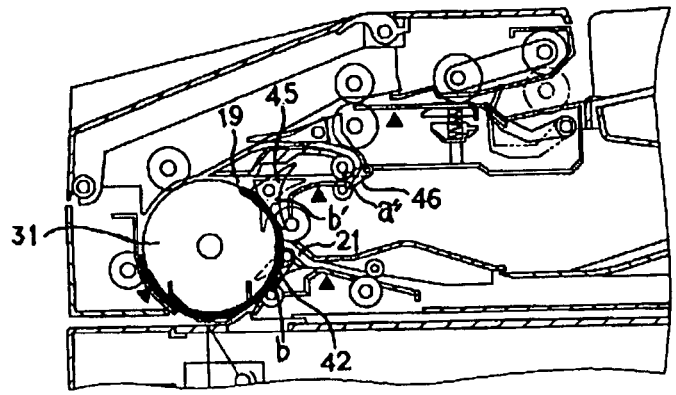
FIGS. 7(a)-7(c) are views showing the original transport mechanism transporting a small original.
Figure 7:
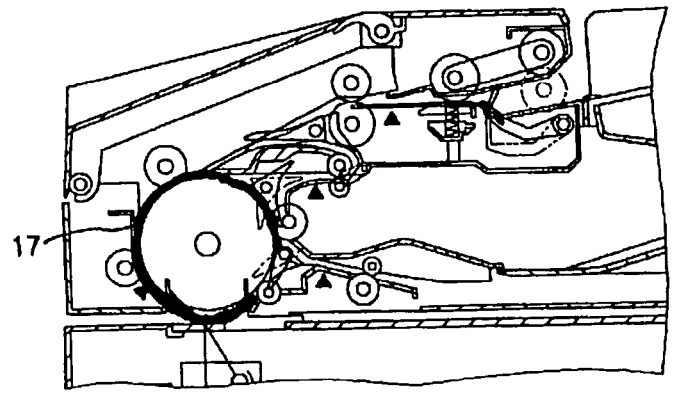
Figure 7:
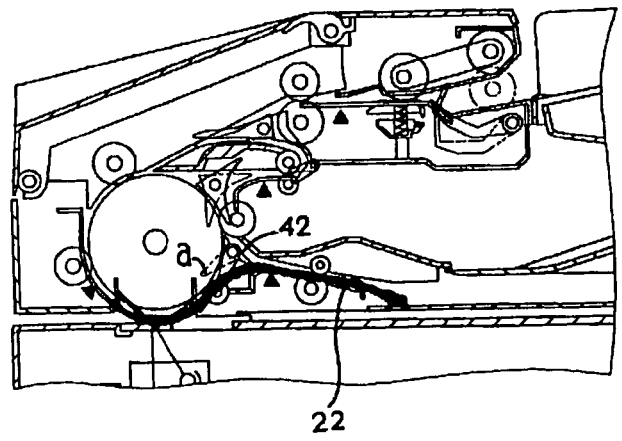

FIG. 12 shows a flow chart showing an operation of reading the original having a small size. A result of the size detection determines that the original is the A4 size (ST40) FIG. 7(a) shows a state of the original at this point. The original is read at the reading position and then transported to the first circulating path 19.

When the size of the original is determined to be the A4 size, the switchback flapper 42 arranged in the intermediate path 21 is positioned at the '(b) position; the first discharge flapper 45 is moved to the (b') position; and the second discharge flapper 46 is moved to the (a") position. The transport roller 31 guides the original into the first circulating path 19 with a forward rotation.

When the original is read, the determining means determines whether the original is black and white or in color (ST42). At this time, the reading speed is 300 mm/sec. If the original is in color, the reading mode is set to be the color reading mode (ST43) to perform the actual scan of the original in the color reading mode (ST44). The reading speed of the original at this time is 100 mm/sec. FIG. 7(b) shows the state of the above operation in which the original passes the transport path 17 and is transported to the reading position again to be read according to the determined reading mode.

When the actual scan of the front side (one side) of the original is completed, the system checks whether a preset reading mode is the duplex reading mode for reading the backside (the other side). If the duplex reading mode is set, it starts reading the backside of the original (ST45).

FIG. 7(c) shows the original transported to the switchback path 22 and turned over to read the other side after the front side is read. At this time, the switchback flap 42 is moved to the (a) position (ST47).

Figure 8:
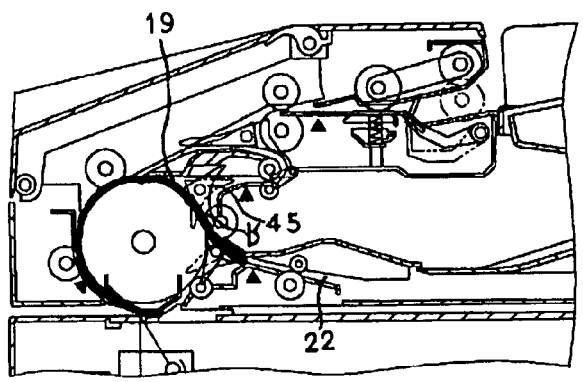
FIGS. 8(a)-8(c) are views showing the original transport mechanism transporting the small original.
Figure 8:
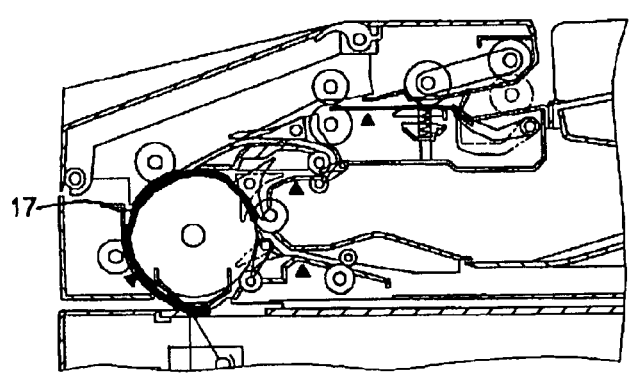
Figure 8:
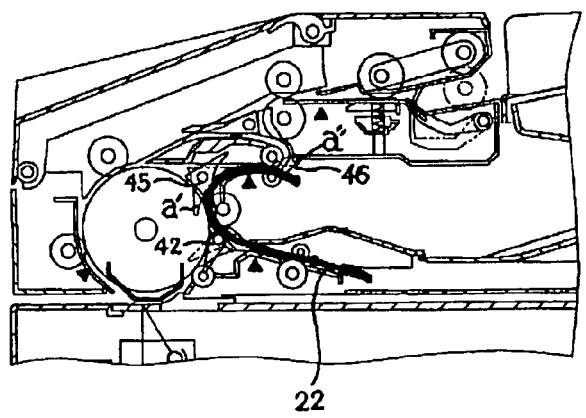

FIG. 8(a) depicts the original transported from the switchback path 22 to the reading position again via the first circulating path 19. At this time, the first discharge flapper 45 is moved to the (b') position. Then, it is determined whether the backside of the original just read is black and white or in color (ST42).

FIG. 8(b) shows the original transported to the reading position again via the transport path 17, and scanned in the actual scan (ST43 and ST44) according to the determined reading mode. The original is then transported to the switchback path 22, when it is confirmed (ST45) that the actual scan has been completed, to arrange the pages of the original, as shown in FIG. 8(c).

The switchback flapper 42 is moved to the (a) position, the first discharge flapper is moved to the (a') position, and the second discharge flapper 46 is moved to the (a") position (ST46 in FIG. 12). The original is transported to the switchback path to turn over from front to back, and is then discharged to the discharge tray 11 via the discharge path 18. If there is another original, the same operation is performed from step 41 (ST41 in FIG. 12).

When the image determining means determines that the original is in black and white (ST42), the reading mode is set to be the black and white reading mode (ST50) to perform the actual scan using the black and white reading mode (ST51) (See FIG. 7(b)) The original reading speed at this time is 200 mm/sec.

When the front side of the original is read, it is detected whether the backside reading mode is set. If the backside reading mode is set, the system starts the operation of reading the backside of the original. FIG. 7(c) shows the original, after the front side thereof is read, transported to the switchback path 22 and turned over from front to back to read the other side. At this time, the switchback flap 42 is moved to the (a) position (ST54).

FIG. 8(a) depicts the original transported from the switchback path 22 to the reading position again via the first circulating path 19 (with the first discharge flapper 45 positioned at the (b') position). Then, it is determined whether the backside of the original just read is black and white or in color (ST42).

As shown in FIG. 8(b), the original is transported to the reading position again via the transport path 17, and undergoes the actual scan according to the determined reading mode. If the reading mode is the black and white reading mode, the original is read in the black and white reading mode (ST50 and ST51).

The original is then transported to the switchback path 22, when it is confirmed (ST52) that the actual scan has been completed, to arrange the pages of the original, as shown in FIG. 8(c). The switchback flapper 42 is moved to the (a) position; the first discharge flapper is moved to the (a') position, and the second discharge flapper 46 is moved to the (a") position (ST53). The original is transported to the switchback path to turn over from front to back, and is then discharged to the discharge tray 11 via the discharge path 18 (ST56). If there is another original, the same operation is performed from step 41.

Figure 9:
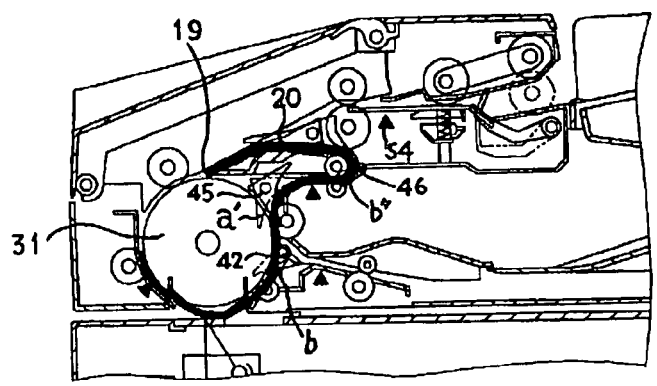
FIGS. 9(a)-9(c) are views showing the original transport mechanism transporting a large original.
Figure 9:
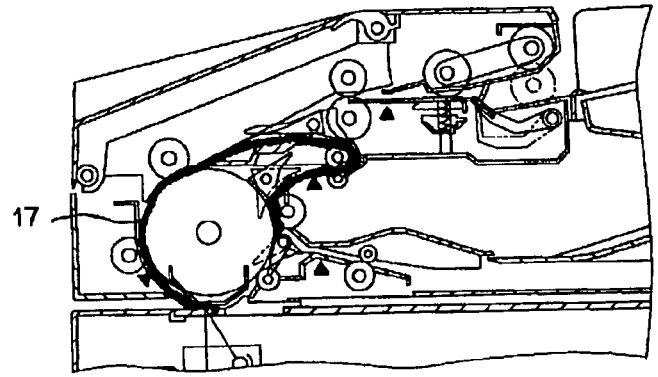
Figure 9:
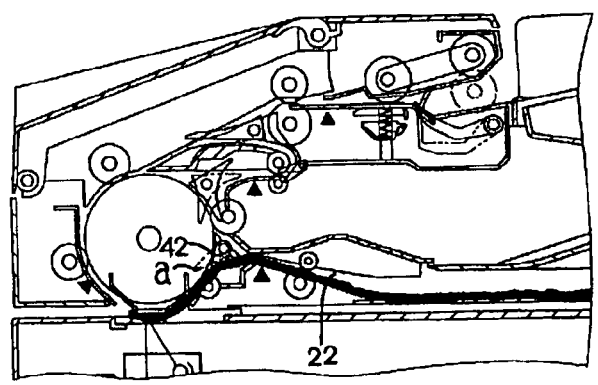

The following explanation will describe an operation of reading both sides of a large-size original. FIG. 13 is a flow chart showing the operation of reading the large-size original. FIG. 9(a) shows a large-size original being read at the reading position and transported to the second circulating path 20.

The size of the original is detected by the sensors S1 and S2 disposed on the original tray 9 and the register sensor S4. When the size of the original is determined to be A3, the switchback flapper 42 arranged in the intermediate path 21 is positioned at the (b) position; the first discharge flapper 45 is moved to the (a') position; and the second discharge flapper 46 is moved to the (b") position (ST21).

The transport roller 31 guides the original into the second circulating path 20 with a forward rotation. When the original is read, the determining means determines whether the read original is black and white or in color (ST22). When the images on the original are determined to be in color, the reading mode is set to the color reading mode (ST23). The original is moved into the first circulating path 19 again, and the actual scan is executed in the color reading mode via the transport path 17 (ST24 in FIG. 13).

As shown in FIG. 9(b), the original is transported to the reading position again via the transport path 17, and undergoes the actual scan according to the determined reading mode. When it is determined that the actual scan of the front side of the original is completed, the system detects whether the backside reading mode has been set (ST25). If the backside reading mode has been set, the original is transported to the switchback path 22 and turned over from front to back to read both sides (the other side) of the original, as can be seen in FIG. 9(c). At this time, the switchback flap 42 is moved to the (a) position (ST27).

Figure 10A:
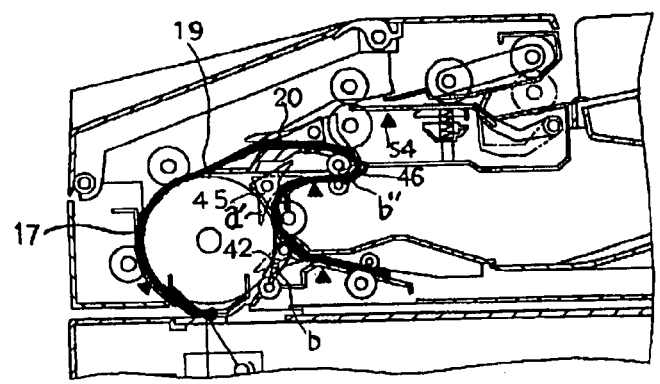
FIGS. 10(a)-10(c) are views showing the original transport mechanism transporting the large original.

FIG. 10(a) shows the original moved to the first circulating path 19 from the switchback path 22 via the second circulating path 20, and to the reading position from the transport path 17. The first discharge flapper 45 is positioned at the (a') position, and the second discharge flapper 46 is positioned at the (b") position. The original turned over is moved to the first circulating path 19 via the second circulating path 20 and then transported to the reading position again.

Figure 10B:
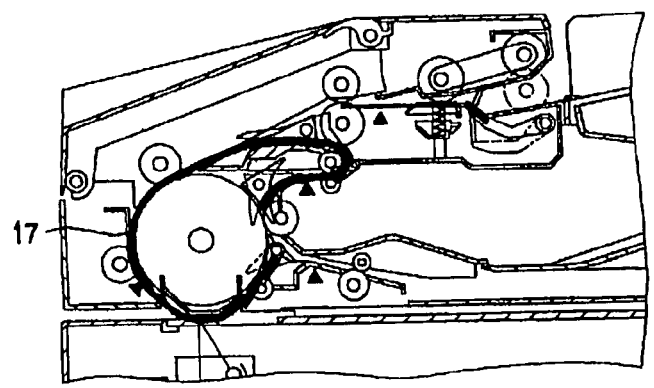

Then, it is determined whether the read original is black and white or in color (ST22 in FIG. 13). If the original is determined to be in color, the same steps (ST23 and ST24 in FIG. 13) as those used to read the front side of the original are executed. As shown in FIG. 10(b), the original is transported to the reading position again via the transport path 17, and undergoes an actual scan according to the determined reading mode.

Figure 10C:
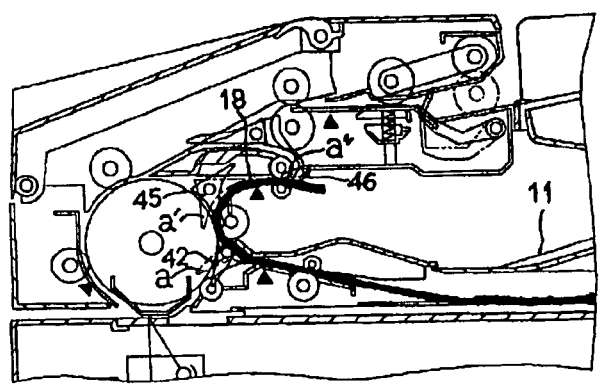

The original, after having been read (ST25), is transported to the switchback path 22 to re-order the pages for discharge to the discharge tray 11, as can be seen in FIG. 10(c). The switchback flapper 42 is moved to the (a) position; the first discharge flapper is moved to the (a') position, and the second discharge flapper 46 is moved to the (a") position (ST26). The original is transported to the switchback path to turn over from front to back, and is then discharged to the discharge tray 11 via the discharge path 18 with the page order corrected and front to back turned over.

Also, if the images on the original surface are determined to be black and white (ST22), the reading mode is set to be the black and white reading mode (ST30). The original is transported from the second circulating path 20 and moved to the first circulating path 19 again, and the actual scan is executed on the original via the transport path 17 (ST31). The reading speed at this time is 200 mm/sec. As shown in FIG. 9(b), the original is transported to the reading position again via the transport path 17, and undergoes the actual scan according to the determined reading mode.

When it is determined that the actual scan of the front side of the original is completed, the system detects whether the backside reading mode has been set (ST32). If the backside reading mode has been set, the original is transported to the switchback path 22 and turned over from front to back to read both sides (the other side) of the original, as can be seen in FIG. 9(c). At this time, the switchback flap 42 is moved to the (a) position (ST34).

As shown in FIG. 10(a), the first discharge flapper 45 is positioned at the (a') position, and the second discharge flapper 46 is positioned at the (b") position. The original turned over is moved to the first circulating path 19 via the second circulating path 20 and then transported to the reading position again. Then, it is determined whether the read original is black and white or in color (ST22).

If the original is determined to include color images, the same steps (ST23 and ST24) as those used to read the front side of the original are executed. As shown in FIG. 10(b), the original is transported to the reading position again via the transport path 17, and undergoes the actual scan according to the determined reading mode.

The original, after having been read, is transported to the switchback path 22 to re-order the pages for discharge to the discharge tray, as can be seen in FIG. 10(c). The switchback flapper 42 is moved to the (a) position; the first discharge flapper is moved to the (a') position, and the second discharge flapper 46 is moved to the (a") position (ST26). The original is transported to the switchback path to turn over from front to back, and is then discharged to the discharge tray 11 via the discharge path 18 with the page order corrected and front to back turned over.

Figure 14:
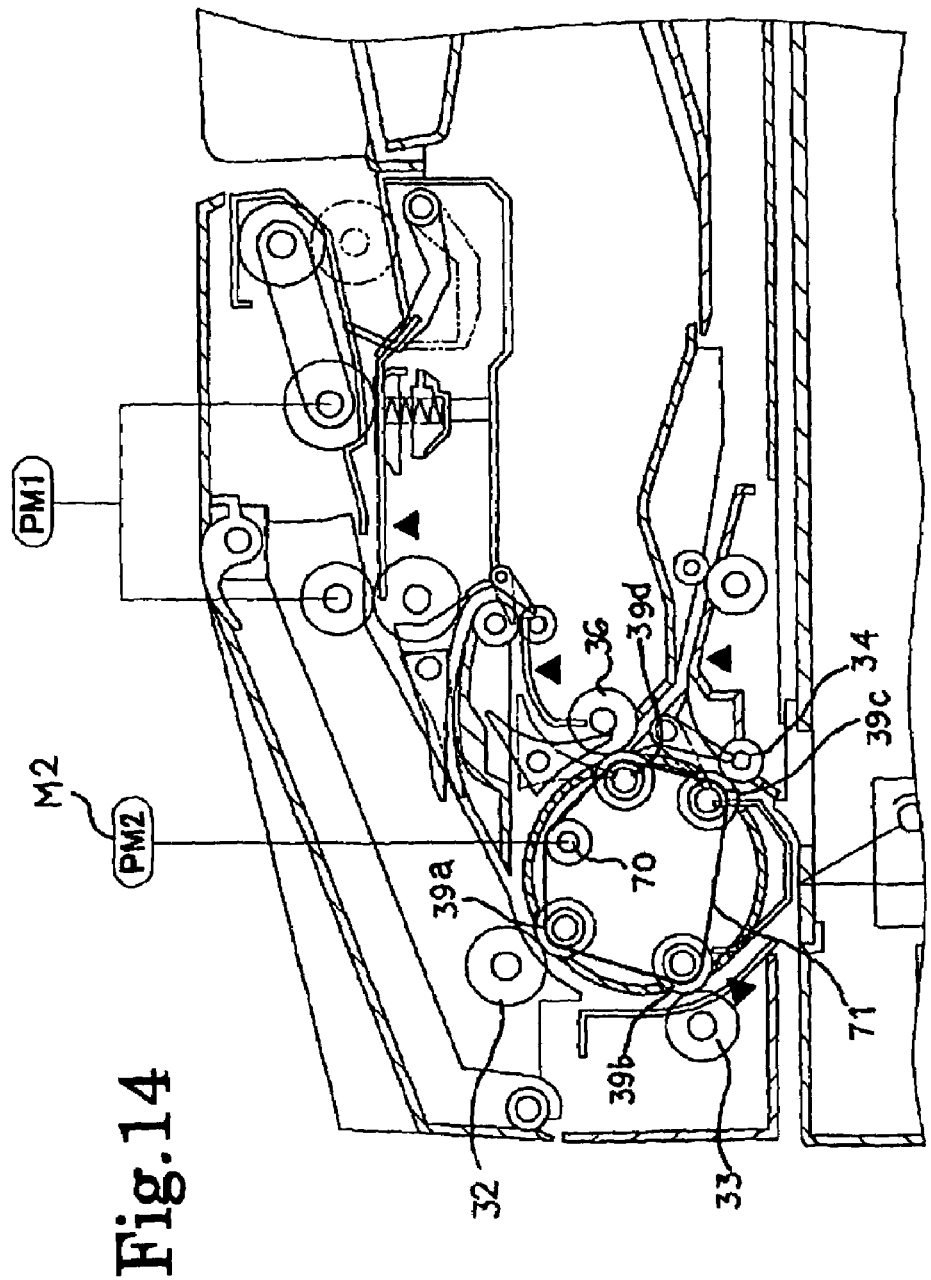
FIG. 14 is a side view of an original, transport device according to the present invention.

The second embodiment of the original transport apparatus according to the present invention will be explained next. FIG. 14 shows an original transport mechanism of an ADF in the second embodiment. In the first embodiment shown in FIG. 2, the transport roller 31 is a large diameter roller. The transport roller in the second embodiment is arranged with the transport rollers 39a, 39b, 39c, and 39d paired with the follower rollers of 32, 33, 34 and 36 as shown in FIG. 12.

The four transport rollers 39a, 39b, 39c, and 39d are driven by the transport motor M.D. Via the belt 71 trained around a drive shaft 70 and the four transport rollers 39a, 39b, 39c, and 39d. The four transport rollers 39a, 39b, 39c, and 39d are configured to press against the paired follower rollers of 32, 33, 34 and 36.

Note that other than the configuration of the transport roller 39, the other configurations and mechanisms in the second embodiment are the same as those in the first embodiment and further descriptions thereof are omitted.

Next, the third embodiment of the present invention will be described. FIG. 15 shows an image reading apparatus according to the third embodiment of the present invention. The image reading apparatus in the third embodiment has an original transport mechanism of an ADF different from the image reading apparatus as shown in FIG. 1 or in FIG. 2, and can read both sides of the original substantially simultaneously. The image reading apparatus is provided with a first reading unit 50 composed of an optical reading unit disposed on a reading device, and a second reading unit 72 disposed on the ADF at a downstream side of the first reading unit.

In the second reading unit 72, a light source irradiates light on a surface of the original, and CCD reading elements read the light reflected from the original. With this configuration, the first reading unit 50 reads one side of the original (a front side), and the second reading unit 72 reads the other side (a backside) of the original. The ADF is provided with an original transport path 17; a first circulating path 73 disposed at a downstream side of the second reading unit 72; and a second circulating path 74 having a length longer than that of the first circulating path 73.

The first circulating path 73 has the first flapper 75 provided at an inlet thereof and moving between (A) and (B) shown in the drawing for guiding the original to either the first circulating path 73 or the second circulating path 74; and a second flapper 76 moving between (A) and (B) shown in the drawing for guiding the original to either the second circulating path 74 or the discharge tray 11.

The original is separated and fed one at a time by sheet supply means from the original tray 9 to a first reading position X via the transport path 17 for a pre-scan. After the front side of the original is read, the second reading unit 72 arranged at a downstream side reads the other side. The original undergoes the pre-scan, and is transported to the discharge path 18, and then to either the first circulating path 73 or to the second circulating path 74, according to a length of the original.

At that time, a short original is transported to the first circulating path 73. A long original (for example, B4 or A3 sizes) is transported to the second circulating path 74 having a longer length so that the leading and trailing edges of the original do not overlap each other. The original is then transported to the transport path 17 again for the actual scan.

In the ADF 1, the first flapper 75 moves to the (A) position so that the original is transported to the first circulating path 73 when the original is determined to be the short size (shorter than a width of the letter size). When the original is determined to be a long size (the B4 or A3 sizes), the first flapper 75 moves to the (B) position, then the second flapper 76 moves to the (A') position. The original is transported to the second circulating path 74, and to the first circulating path 73, then is transported to the first and second reading units of 50 and 72 via the transport path 17 again for the actual scan. When the actual scan is completed, the first flapper 75 moves to the (B) position and the second flapper 76 moves to the (B') position. When the actual scan is completed, the original is discharged to the discharge tray 11.

With the configuration described above, it is possible to read the both sides of the original with the pre-scan for determining the both sides of the original, and the actual scan for reading the both sides according to the result determined by the pre-scan.

As described above in detail, according to the present invention, the image reading apparatus comprises reading means for reading the original at a predetermined reading position, image determining means for determining whether the original read by the reading means includes black and white images or color images, original length determining means for determining the length of the original in the transport direction, a first circulating path for returning the original to the reading position, a second circulating path having a path longer than that of the first circulating path for returning the original to the reading position, and selection means for selecting one of the first circulating path and the second circulating path to which the original is guided according to the length of the original.

With the configuration, the image reading apparatus reads the originals that are fed by the ADF. It is determined whether the original is the large size or the short size, and whether the original is black and white or in color. The reading mode is set accordingly and the original is read with the reading mode. The original is transported to the different transport paths according to the size. Therefore, it is possible to read the original containing both black and white and color images at the high speed.

While the invention has been explained with reference to the specific embodiments of the invention, the explanation is illustrative and the invention is limited only by the appended claims.

What is claimed is:

1. An image reading apparatus comprising:
    an original tray for placing an original;
    a discharge tray located under the original tray;
    a transport path for guiding the original sent from the original tray to a predetermined reading position;
    reading means for reading the original transferred along the transport path at the reading position;
    original length determining means for determining a length of the original in a transport direction as at least a long length and a short length shorter than the long length;
    a first circulating path for returning the original to the reading position in the transport path after the original passes the reading position;
    a second circulating path disposed between the original tray and the discharge tray and having a length longer than that of the first circulating path for returning the original to the reading position in the transport path after the original passes the reading position;
    a switchback path for changing the transport direction of the original transferred from the reading position, said switchback path being located at a downstream side of the first and second circulating paths and at an upstream side of the reading position; and
    selection means for selecting one of the first circulating path and the second circulating path according to the length of the original determined by the original length determining means, said selection means having a switch device for guiding the original from the reading position to the first circulating path through the switchback path or for guiding original to the first or second circulating path without passing through the switchback path.

2. An image reading apparatus according to claim 1, wherein said second circulating path includes a branch path extending from the first circulating path at a downstream side of the reading position in the transport direction, said branch path rejoining to the first circulating path.

3. An image reading apparatus according to claim 2, wherein said branch path is arranged for returning the original to the first circulating path after the original passes through the reading position and before it is discharged from a discharge outlet.

4. An image reading apparatus according to claim 1, wherein said original length determining means determines the length of the original according to data input from an external source.

5. An image reading apparatus according to claim 1, further comprising image determination means for determining whether the original read by the reading means has a black and white image or a color image.

6. An image reading apparatus according to claim 1, wherein said original tray and said switchback path are disposed above the reading position such that said switchback path is located under the original tray, and the discharge tray for receiving the original from the reading position is located between the original tray and the switchback path.

7. An image reading apparatus according to claim 1, further comprising a discharge path for discharging the original transferred from the reading position to the discharge tray.

8. An original transport apparatus according to claim 6, wherein said second circulating path includes path switching means for guiding the original transported to the discharge path to the second circulating path.

9. An original transport apparatus comprising:
    a transport path for guiding an original from an original tray to a reading position;
    a first return path for returning the original to the transport path without turning over the original transported to the reading position;

a second return path having a length longer than that of the first return path for returning the original to the transport path without turning over the original transported to the reading position;

a switchback path for turning over the original transported from the reading position, and for returning the original to the transport path; and a discharge path for discharging the original transported from the reading position to a discharge tray arranged below the original tray.

10. An original transport apparatus according to claim 9, wherein said switchback path, said first return path and said second return, path are arranged at a downstream side of the reading position in a transport direction.

11. An original transport apparatus according to claim 9, wherein said second return path includes path switching means for guiding the original transported to the discharge path to the first return path.

12. An image reading method for sequentially reading two sides of an original, comprising the steps of:

determining a length of the original in a transport direction;

reading one side of the original passing through a transport path by reading means at a reading position;

determining whether the one side of the read original has a black and white image or a color image;

selecting one of a first circulating path and a second circulating path having a length longer than that of the first circulating path for returning the original to the reading position according to the length of the original;

transporting the original to the reading position through the one of the first circulating path and the second circulating path;

setting a mode of reading the one side of the original according to a result of the step of determining whether the one side of the read original has a black and white image or a color image;

reading the image on the one side of the original using the mode set in the step of setting the mode;

turning over the original in a switchback path after reading the image on the one side of the original;

returning the original to the reading position;

reading an image on the other side of the original;

determining whether the other side of the original has an black and white image or a color image;

transporting the original to the reading position through the one of the first circulating path and the second circulating path;

setting a mode of reading the other side of the original according to a result of the step of determining whether the other side of the original has an black and white image or a color image; and reading the image on the other side of the original using the mode set in the step of setting the mode.

13. An image reading apparatus comprising:

reading means for reading an original transferred along a transport path at a reading position;

image determination means for determining whether the original has a black and white image or a color image;

original length determining means for determining a length of the original in a transport direction as at least a long length and a short length shorter than the long length;

a first circulating path for returning the original to the reading position in the transport path after the original passes the reading position;

a second circulating path having a length longer than that of the first circulating path for returning the original to the reading position in the transport path after the original passes the reading position; and selection means for selecting one of the first circulating path, and the second circulating path according to the length of the original, wherein said original length determining means determines the length of the original according to data input from an external source.

* * * * *